United States Patent Office
3,482,268
Patented Dec. 9, 1969

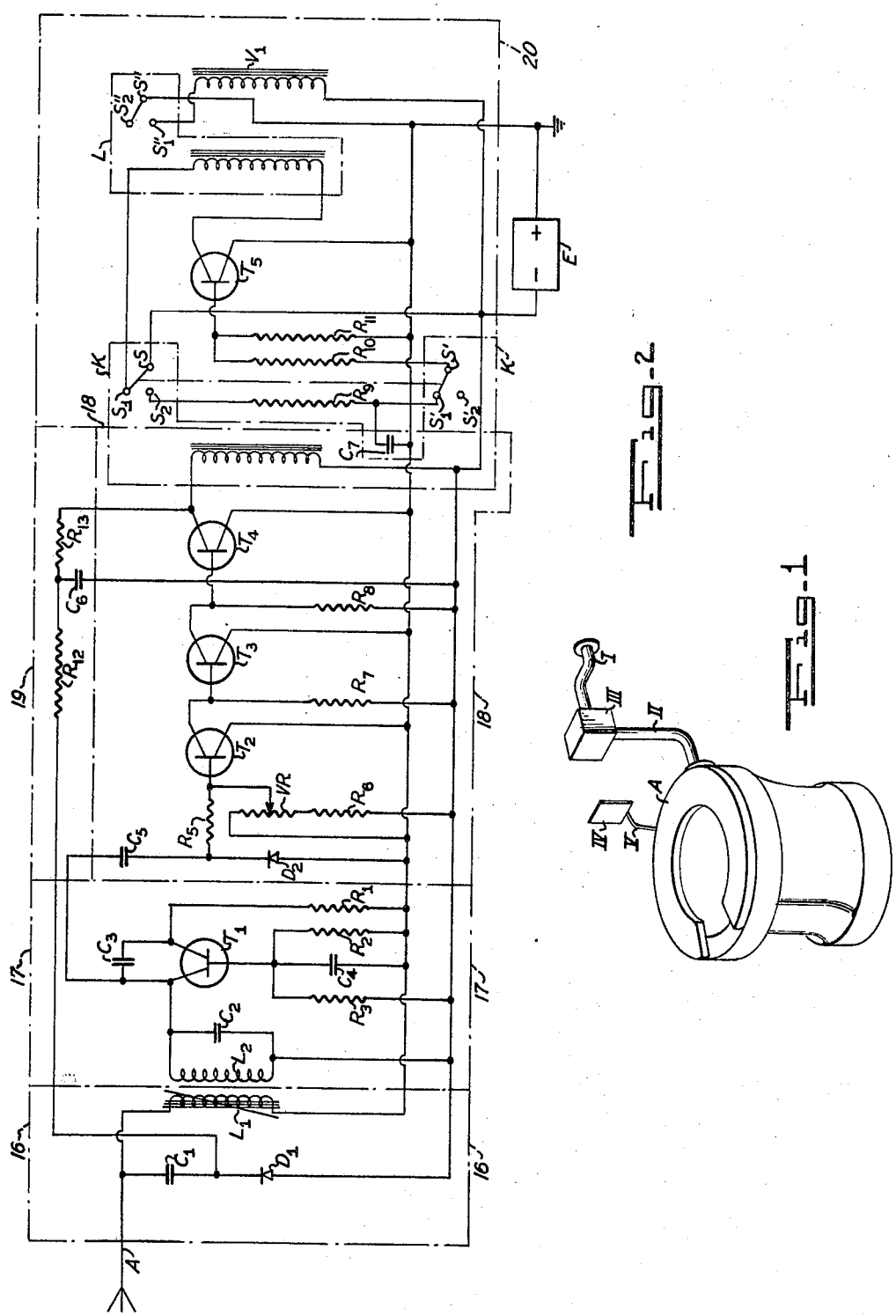

3,482,268
APPARATUS FOR THE AUTOMATIC FLUSHING OF TOILETS
Minoru Teshima, Tokyo, Japan, assignor to Minoru Fukumitsu and James M. Morita, Honolulu, Hawaii
Filed Mar. 31, 1965, Ser. No. 444,118
Int. Cl. E03d *11/08*
U.S. Cl. 4—100                                                9 Claims

ABSTRACT OF THE DISCLOSURE

An apparatus for the automatic flushing of toilets constructed such that when a human body comes near the toilet seat, an antenna which is a part of a sensing device and installed in the toilet seat detects the presence of this human body which has a high-electrical capacity. When such body is detected, the sensing device becomes tuned with an oscillation circuit. A switching circuit which is operatively coupled to the flushing apparatus detects the aforesaid tuned relation and is operative to accumulate an electrical charge. When the body moves away from the sensing device, the latter and the oscillation circuit become detuned and the switching circuit operates the flushing apparatus for the particular period of time in which the accumulation charge is dissipated. Thereafter the flushing apparatus is inoperative and the sensing device is ready for further sensing operation.

---

This invention relates to apparatus for the automatic flushing of toilets.

It is an object of the invention to provide for the automatic flushing of a toilet for a predetermined period of time subsequent to its use.

It is a further object of the invention to detect the presence of a human body proximate the toilet and to automatically flush the toilet subsequent to the departure of the body.

It is a still further object of the invention to provide for an automatic flushing operation which eliminates the need for manual activation.

In accordance with the invention, the above objects are satisfied by the provision of a sensing device which detects the presence of a human body by the relatively high electrical capacity of such body, said sensing device becoming tuned with an oscillation circuit when said body is detected. A switching circuit which is operatively coupled to the flushing apparatus detects the aforesaid tuned relation and is operative to accumulate an electrical charge. When the body moves away from the sensing device, the latter and the oscillation circuit becomes detuned, and the switching circuit operates the flushing apparatus for the particular period of time in which the accumulated charge is dissipated. Thereafter the flushing apparatus is inoperative and the sensing device is ready for further sensing operation.

Additional objects and advantages of the invention will become apparent from a consideration of the following detailed description taken in conjunction with the attached drawing wherein:

FIGURE 1 is a diagrammatic perspective view of the apparatus according to the invention; and FIGURE 2 is a circuit diagram of the relevant electrical components of the apparatus of FIG. 1.

As shown in FIG. 1, water feeding pipe I and flushing pipe II are connected through an electromagnetic valve III, and a transistor circuit arrangement IV is provided to operate the electromagnetic valve and is located at a suitable place, with an antenna lead-in wire V, to which an antenna A is firmly connected. The antenna is installed in the lower surface of the toilet seat, which is made of wood or plastic, where the antenna cannot be seen.

The circuit arrangement is shown in FIG. 2. An antenna circuit 16 is provided which is composed of a variable-capacity diode $D_1$, one end of which is connected to a direct-current power source E which is grounded on its positive side. The D.C. source may be either a storage battery or a D.C. power source obtained by converting a commercial A.C. power supply by means of a transformer for voltage reduction and a rectifier. The circuit 16 further comprises a condenser $C_1$ provided between the cathode side of the diode $D_1$ and antenna A, and a variable trap coil $L_1$ connected to the antenna and to the ground. An oscillation coil $L_2$ is wound on the same core with trap coil $L_1$ so that both coils are electrically connected. Connected in parallel with the oscillation coil is a condenser $C_2$, which has one end connected to the direct-current power source E and the other end linked with the collector of a transistor $T_1$. A condenser $C_3$ is inserted between the emitter and collector of the transistor $T_1$, and the base of the transistor $T_1$ is grounded through the parallel connection of a resistor $R_2$ and a condenser $C_4$ and is also connected to the power source E through a resistor $R_3$ to bias the transistor $T_1$. Thus, a base-grounded oscillation circuit 17 is formed.

The output of the oscillation circuit 17 is impressed on a switch circuit 18 which is provided in the next stage. This circuit is a switch circuit using transistors.

In this switch circuit, the oscillation output of the transistor $T_1$ of the oscillation circuit 17 in the previous stage is fed from the collector through a condenser $C_5$ and rectified by a rectifier $D_2$ having one end connected to the ground. The voltage of the current rectifier by the diode $D_2$ is applied through a resistor $R_5$ to the base of a transistor $T_2$, having a base circuit including a variable resistor VR that is grounded at one end.

On the output side of the switch circuit 18, namely, between the power source E and the collector of a transistor $T_4$, there is connected a first relay K which is equipped with two sets of switching contacts (S, $S_1$ and $S_2$) and (S', $S_1'$ and $S_2'$).

A compensating time-constant circuit 19 is inserted between the first relay K and the variable-capacity diode of the antenna circuit 16. Said circuit 19 comprises a resistor $R_{13}$ connected to one end of the first relay K, a condenser $C_6$, and a resistor $R_{12}$ between the condenser $C_6$ and the diode $D_1$. The switching contact S of the first relay K is connected to the direct-curret power source E, and the fixed contact $S_1$ joins with one end of the second relay L, the other end of which is connected to the collector of a transistor $T_5$. The base of the transistor $T_5$ is grounded through a resistor $R_{11}$ and also connected through a resistor $R_{10}$ to the switching contact S' of the first relay K. The fixed contact $S_1'$ is linked with one end of a condenser $C_7$ having the other end connected to ground, and with one end of a resistor $R_9$. The other end of the resistor $R_9$ is connected to the fixed contact S, of the first relay K. The emitter of the transistor $T_5$ is grounded. Said transistor $T_5$, condenser $C_7$, resistors $R_{10}$ and $R_{11}$, and the second relay L form a timing circuit 20. Connected to the fixed contact $S_1''$ of the second relay L is one end of electromagnetic valve $V_1$, the other end of which is connected to the direct-current power source E. The switching contact S'' of the second relay L is connected to ground.

When the direct-current power source E supplies energy and the trap frequency of the coil $L_1$ of the antenna circuit 16 is adjusted slightly higher than the oscillation frequency $f$ (a suitable value is about 20 mc.) determined by the coil $L_2$ and condensers $C_2$ and $C_3$ of the oscillation circuit 17, the approach of a human body to the top side of the toilet seat applies an electrostatic capacity to the antenna A and adds the capacity to coil $L_1$; accordingly, the trap frequency of the winding $L_1$ draws near the oscillation frequency $f$ and at last becomes tuned therewith. Prior to this tuning, the oscillation power impressed upon the diode $D_2$ from the collector of the transistor $T_1$ through condenser $C_5$ has its rectified voltage applied to the base of the transistor $T_2$, and further the operating state of the switch circuit is predetermined by the adjustment of the variable resistor VR, so that, according to the tuning, the coil $L_1$ acts as a trap for the coil $L_2$, and consequently the rectified voltage caused by the oscillating power disappears and thus the switch circuit starts operating and the first relay K begins to operate.

When the first relay K operates, the contact S of the relay K is connected to contact $S_2$ and charges condenser $C_7$ through resistor $R_9$. When the human body leaves the toilet seat, this brings about the detuning of coil $L_1$ and the first relay is released and contact S moves to contact $S_1$, which is connected, through the second relay L, to the collector of transistor $T_5$. The emitter of this transistor $T_5$ is grounded and the base is connected to the contact S' of the first relay K through resistor $R_{10}$. To the contact S' are connected one end of condenser $C_7$ and one end of resistor $R_9$. Therefore, the release of the first relay K connects contact S' to contact $S_1'$, and the voltage charge in condenser $C_7$ biases transistor $T_5$ through resistor $R_{10}$ and current flows to transistor $T_5$ to operate the second relay L, thereby allowing water to start flowing to flush the toilet.

The voltage charged in condenser $C_7$, however, is discharged through resistors $R_{10}$ and $R_{11}$, thus reducing the bias on transistor $T_5$, until it no longer can maintain the operation of the second relay L whereupon the relay L is released and cuts off the current flow through the electromagnetic valve and the flow of water stops. By arranging the time of water flow to condenser $C_7$, resistors $R_{10}$ and $R_{11}$ as the time constant, the toilet bowl can be completely flushed and cleaned. The time of water depends largely on the water pressure and preferably is arranged to be about ten seconds duration.

Since the automatic toilet flushing apparatus deals with water, sometimes an unforeseen change in electrostatic capacity due to humidity and other external conditions may cause erroneous operation of the apparatus. The above noted compensating circuit 19 is provided in order to maintain the operation of this apparatus sound and steady.

For example, human body movement causes a potential difference between both ends of the first relay K of the switch circuit. Accordingly, condenser $C_6$ is charged through resistor $R_{13}$. After the charging, the electric potential of the collector of transistor $T_4$ becomes the same as that of the common terminal of resistor $R_{13}$ and condenser $C_6$. Thus, the voltage impressed on the variable capacity diode $D_1$ is proportional to the charge in condenser $C_6$ and gradually increases. With this increase the internal capacity of diode $D_1$ decreases and so does the capacity of the antenna circuit; consequently, the trap frequency gets out of tune.

When the human body which has a large electrostatic capacity comes near the antenna A, the first relay K operates readily since the internal capacity of diode $D_1$ varies little if body approach is made within the time given to the compensating timing circuit (several seconds in this case). But after a few seconds, the diode $D_1$ decreases its capacity and the first relay is released immediately when the human body departs from the antenna causing the relay L to start to operate and the water to start to flow. Since the change in capacity of the diode $D_1$ is smaller than the capacity of the human body, as long as the body remains near the antenna the first relay does not release itself.

When the first relay is released and loses potential difference, the voltage charged in the condenser $C_4$ discharges through resistor $R_{13}$ and the first relay K and the internal capacity of diode $D_1$ increases and is readied for the next operation. On the other hand, the current runs through transistor $T_5$ after the release of the first relay K, and when the time of its time-constant circuit has passed, the second relay L is released and the water flows stops and there is no interference for the next operation. Also a slight change in capacity during a long time exceeding the time of the compensating timing circuit can be compensated by the capacity variation of diode $D_1$.

The apparatus, as mentioned above, comprises the antenna circuit, oscillation circuit, switch circuit, timing circuit, and in addition, the compensating timing circuit which is connected between the swtich circuit and the variable-capacity diode of the antenna circuit and prevents any unforeseen erroneous operation. The apparatus also has a circuit which enables the flow of water immediately after use of the toilet while there is also provided a time constant circuit to stop the water flow. The apparatus is sanitary and it is most convenient to use a toilet equipped with the above mentioned device.

In summary, it is seen that the circuit is operative by applying electrostatic capacity to the antenna installed in the toilet seat. Immediately after operation of the circuit stops, the electromagnetic valve is energized and opened to start the flow of water. The timing circuit stops the water flow by closing the electromagnetic valve after a certain period of time. All circuits are transistorized. The compensating circuit withstands any slight electromagnetic capacity change over a long period of time to keep the operation of the automatic toilet steady and sound.

Numerous variations and modifications of the disclosed embodiments and methods will become apparent to those skilled in the art without departing from the scope and spirit of the invention as desired in the appended claims.

What is claimed is:

1. In combination, an electrovalve and a control circuit for operating said electrovalve, said control circuit comprising a D.C. power source, an oscillation circuit coupled to said power source and having an oscillation output, switch circuit means coupled to the oscillation circuit and including relay means, said switch circuit means being coupled to said electrovalve for controlling operation thereof, said relay means having first and second states, said switch circuit means including a timing circuit having charged and discharged states, the control circuit further comprising antenna circuit means connected to the oscillation circuit for influencing the latter in accordance with the proximity to said antenna circuit means of a body having a relatively large electrostatic capacity to change the state of the relay means such that with the electrostatic capacity proximate the antenna circuit means, the relay means assumes its second state and the timing circuit is energized, the subsequent movement of the electrostatic capacity away from the antenna circuit means causing the relay means to assume the first state thereof while the timing circuit for a limited preestablished period of time passes from the charged to the discharged state, the electrovalve being coupled to said switch circuit means for being operated only during said limited period of time when the timing circuit is discharging and wherein said control circuit comprises compensating circuit means coupled between the antenna circuit means and the switch circuit means to overcome any slight changes in electrostatic capacity in the antenna circuit means over relatively short periods of time and a variable capacity diode in said antenna circuit means for compensating changes in electrostatic capacity over relatively long periods of time.

2. In combination, an electrovalve and a control circuit for operating said electrovalve, said control circuit comprising a D.C. power source, an oscillation circuit coupled to said power-source and having an oscillation output, switch circuit means coupled to the oscillation circuit and including relay means, said switch circuit means being coupled to said electrovalve for controlling operation thereof, said relay means having first and second states, and antenna circuit means connected to the oscillation circuit for influencing the latter in accordance with the proximity to the antenna circuit means of a body having a relatively large electrostatic capacity to change the state of the relay means, said switch circuit means in the first state of the relay means being operative to maintain the electrovalve in closed positions, and accumulate an electrical charge such that as the relay means passes to the second state upon movement of the said body away from the antenna circuit means the switch circuit means is operative to open said valve for a limited preestablished period of time during which the accumulated charge is dissipated and after which the valve is returned to its closed state and wherein said control circuit comprises compensating circuit means coupled between the antenna circuit means and the switch circuit means to overcome any slight changes in electrostatic capacity in the antenna circuit means over relatively short periods of time, and a variable capacity diode in said antenna circuit means for compensating changes in electrostatic capacity over relatively long periods of time.

3. In combination, an electrovalve and a control circuit for operating said electrovalve, said control circuit comprising a D.C. power source, an oscillation circuit coupled to said power source and having an oscillation output, switch circuit means coupled to the oscillation circuit and including relay means, said switch circuit means being coupled to said electrovalve for controlling operation thereof, said relay means having first and second states, and antenna circuit means connected to the oscillation circuit for influencing the latter in accordance with the proximity to the antenna circuit means of a body having a relatively large electrostatic capacity to change the state of the relay means, said switch circuit means in the first state of the relay means being operative to maintain the electrovalve in closed positions, and accumulate an electrical charge such that as the relay means passes to the second state upon movement of the said body away from the antenna circuit means the switch circuit means is operative to open said valve for a limited preestablished period of time during which the accumulated charge is dissipated and after which the valve is returned to its closed state and wherein said antenna circuit means comprises an antenna sensitive to the electrostatic capacity of said body, a variable capacity diode connected to said power source a condenser connected to said antenna and to said diode and a variable coil coupled to the antenna and ground.

4. The combination as claimed in claim 3 wherein said oscillation circuit comprises an oscillation coil electrically coupled to the coil of the antenna circuit means, a condenser connected in parallel with said coil, a transistor having a grounded base, a collector coupled to the oscillation coil and an emitter, and a condenser connected between the emitter and the collector of said transistor.

5. The combination as claimed in claim 4 wherein the switch circuit means comprises a condenser and a diode rectifier connected in series with the transistor of the oscillation circuit and ground, and a plurality of series connected transistors the first of which has a base receiving rectified voltage from the output of the transistor of the oscillation circuit and a base circuit including a grounded variable resistance.

6. The combination as claimed in claim 5 wherein the switch circuit means includes a transistor and the relay means comprises a first and second relay, said first relay including two sets of switches, and a resistance-condenser circuit, the condenser being charged with said accumulated charge in one position of the switches while the latter transistor is energized by the charge from the condenser in the other position of the switches, said second relay being coupled to said electrovalve and to said latter transistor for opening the electrovalve when the latter transistor is energized, and said latter transistor, resistance-condenser, and second relay constitute a timing circuit which closes the second relay and opens the electrovalve for only said limited preestablished period of time during which the accumulated charge is dissipated.

7. The combination as claimed in claim 6 wherein said control circuit comprises compensating circuit means coupled between the antenna circuit means and the switch circuit means to overcome any slight changes in electrostatic capacity in the antenna circuit means over relatively long periods of time, the compensating circuit means comprising a condenser connected to the power source and resistors connected to the latter condenser and respectively to the emitter of the last transistor of the switching means and to the oscillation circuit means between the condenser and diode thereof.

8. The combination as claimed in claim 7 further comprising a toilet including a toilet seat, the antenna being mounted on the toilet seat.

9. The combination as claimed in claim 8 further comprising means for the flow of water for flushing the toilet, said electrovalve controlling the latter means.

References Cited
UNITED STATES PATENTS 3,314,081   4/1967   Atkins et al.  ---------- 4—100
3,368,225   2/1968   Takechi et al.  ---------- 4—249

LAVERNE D. GEIGER, Primary Examiner

JEFFREY S. MEDNICK, Assistant Examiner